(12) United States Patent
Reithmeier

(10) Patent No.: US 10,438,435 B2
(45) Date of Patent: Oct. 8, 2019

(54) VALUABLE OBJECT AND A SYSTEM AND METHOD FOR IDENTIFYING AND VERIFYING A VALUABLE OBJECT

(71) Applicant: Klaus Niedermeier, Leiblfing (DE)

(72) Inventor: Sieglinde Reithmeier, Leiblfing (DE)

(73) Assignee: Klaus Niedermeier, Leiblfing (DE)

( * ) Notice: Subject to any disclaimer, the term of this patent is extended or adjusted under 35 U.S.C. 154(b) by 0 days.

(21) Appl. No.: 15/752,423

(22) PCT Filed: Aug. 12, 2016

(86) PCT No.: PCT/EP2016/069303
§ 371 (c)(1),
(2) Date: Feb. 13, 2018

(87) PCT Pub. No.: WO2017/029247
PCT Pub. Date: Feb. 23, 2017

(65) Prior Publication Data
US 2019/0051080 A1 Feb. 14, 2019

(30) Foreign Application Priority Data

Aug. 19, 2015 (EP) .................................. 15181643

(51) Int. Cl.
| | |
|---|---|
| G07D 5/00 | (2006.01) |
| G06K 19/077 | (2006.01) |
| A44C 21/00 | (2006.01) |
| G06K 19/06 | (2006.01) |

(52) U.S. Cl.
CPC ............... *G07D 5/00* (2013.01); *A44C 21/00* (2013.01); *G06K 19/06178* (2013.01); *G06K 19/07762* (2013.01)

(58) Field of Classification Search
None
See application file for complete search history.

(56) References Cited

U.S. PATENT DOCUMENTS

| | | | |
|---|---|---|---|
| 8,659,389 B2* | 2/2014 | Nasser | H04Q 9/00 340/1.1 |
| 2013/0062156 A1* | 3/2013 | Chandaria | G07D 5/00 194/339 |

(Continued)

FOREIGN PATENT DOCUMENTS

| | | |
|---|---|---|
| DE | 20 2005 008 540 U1 | 12/2005 |
| WO | 2010090430 A2 | 8/2010 |

OTHER PUBLICATIONS

International Search Report of Corresponding International Application No. PCT/EP2016/069303, dated Aug. 12, 2016.

*Primary Examiner* — Kristy A Haupt
(74) *Attorney, Agent, or Firm* — Robert W. Morris; Ojeiku C. Aisiku; Eckert Seamans Cherin & Mellott, LLC

(57) ABSTRACT

The invention relates to a valuable object (1) comprising a gold base body (2) surrounded by a protective layer (3). The protective layer (3) comprises at least one readable security code for identification and verification purposes. The invention also relates to a system and method for identifying and verifying a valuable object (1), having at least one readable security code (6) being assigned thereto. The security code (6) of the valuable object (1) is stored in a secure database (4) for identifying and verifying a valuable object (1).

20 Claims, 1 Drawing Sheet

(56) References Cited

U.S. PATENT DOCUMENTS

| | | | |
|---|---|---|---|
| 2014/0069997 A1* | 3/2014 | Eldefrawy | G07D 7/004 |
| | | | 235/375 |
| 2014/0292477 A1* | 10/2014 | Ahmadloo | G06K 7/10168 |
| | | | 340/5.8 |
| 2015/0294214 A1* | 10/2015 | Boulby | G06K 19/07758 |
| | | | 340/10.6 |

* cited by examiner

VALUABLE OBJECT AND A SYSTEM AND METHOD FOR IDENTIFYING AND VERIFYING A VALUABLE OBJECT

The present invention relates to a valuable object and a system for identifying and verifying a valuable object, such as gold coin or an item of jewelry.

For example, a scratch-resistant surface for jewelry is known from the document DE 20 2005 008 540 U1. If jewelry is made of precious metals, such as gold, silver or the like, the surface usually has a reduced scratch resistance. To prevent unwanted wear or destruction of the surface, the surface of the jewelry is provided with particles of a particular hardness. Thus, a hardened surface is provided for the jewelry, so that the surface of the jewelry is protected against unwanted wear and destruction.

It has been shown that valuable objects, such as jewelry or the like, can be manipulated, which can considerably reduce the value of the object, without this being externally perceptible. For example, in the context of counterfeit coins, it is known that the valuable article made of a precious metal is manipulated by at least partially removing the precious metal, in particular the inner core, and by introducing a cost-effective replacement material. This manipulation is not recognizable externally. To be able to recognize such manipulations, various laboratory testing methods are required, which are time-consuming and cost-intensive. Under certain circumstances, a test method that destroys the material is necessary to detect the manipulation. In this case, however, the valuable item is destroyed in a disadvantageous manner or at least considerably damaged.

SUMMARY OF THE INVENTION

The problem addressed by the present invention is to provide a valuable object of the type described above, and a system and method, which enable a fast, secure and non-destructive identification and verification of the valuable object.

According to the invention this problem is solved by providing a valuable object, comprising a base body made of gold, preferably of fine gold, wherein the base body is surrounded by a protective layer and wherein the protective layer includes at least one readable preferably personalized security code with at least one security feature for uniquely identifying and verifying or authenticating the valuable object.

The protective layer that completely surrounds the valuable object and that accommodates the security code that implements the non-destructive identification and verification of the valuable object is provided to protect the valuable object, on the one hand, against external damage and, on the other hand, against manipulation. Through the arrangement and the integration of the security code, respectively, according to the invention in or into the protective layer, the particularly fast and secure verification of the valuable object s realized. In this way, the genuineness of the valuable object can be determined easily and quickly via the readable personalized security code not only in case of a manipulation but also in case of a loss of the valuable object. Readable in this context means that the security code is readable optically, electronically or the like practically in real time. Personalized in this context means that the code be uniquely identified and correlated to an owner, for example.

Thus, with the proposed valuable object a forgery-proof investment is created for example as a collector or trade item. The dimensions and the outer surface shape of the base body or the protective layer can be selected as desired. For example, additional embossing or the like may be present. The forgery-proof high-performance protective layer reliably prevents manipulation of the valuable object, which is preferably made of fine gold with a purity of 24 carats.

For example, the protective layer surrounding the base body can be implemented by chemical or non-chemical coating methods. A stable, break-resistant and wear-free as well as durable and long-lasting protective layer is realized by using nanoparticles and/or nanocomponents. The particular arrangement of the nanoparticles also protects the security code from manipulation. It is also conceivable that, for example, an indestructible special film or fleece and/or an additional hologram carrier component is used as a security feature in the protective layer.

The proposed security code of the valuable object, which may be located inside and/or on the surface of the protective layer, not only allows unique marking of the valuable object and thus a unique identification, but also a verification, since a change of the code can be detected when reading it. Each valuable object is provided with the security code during manufacture, so that an individual, non-characteristic, preferably randomly generated unique code pattern is generated, for example, by means of nanoparticles and/or other chemical coatings, so that each valuable object receives its own and unique history of the authenticity certification. In this way, the valuable object or the fine gold piece can be uniquely identified and verified along the entire life. If the complete code is no longer contained in the protective layer, for example by manipulation, this can be detected easily in real time when reading out and subsequently.

In the case of the valuable object according to the invention, an advantageous development provides at least one additional security feature in the protective layer for additional verification of the valuable object. By using the at least one additional security feature, another reliable protection mechanism is realized in the proposed valuable object. By means of this double protection according to the invention, a loss of value in the valuable object through manipulation can be reliably excluded. This is particularly the case because the life of the gold piece or the valuable object can be traced back to the date of manufacture, value and forgery-proof by these security elements.

Security features that can be used, for example, can be obvious security features such as 3D/3D switch (making 3D visible), bas-relief (relief presentation), e-beam motion (electron beam lithography in the nano range) or the like. However, it is also conceivable that either alternatively or additionally open security features, such as microtext, smart glint (small shimmer), letter lens/mirrow lens (lenses), decolor effect (watermark) or the like are used. Additionally, or alternatively, hidden and/or invisible security features can be used. Hidden security features can include, for example, micro- or nanotexts, nanoswitch (information between individual processor cores via light signals instead of electrons), animated cover laser readable image CLR (hidden text or hidden images), volume images (acquisition of the shape, the overall surface area and the local material properties from which the spatial and quantitative structure of the valuable object is reconstructed) or the like. Forensic features such as the introduction of DNA or like materials may be used as invisible security features.

The problem underlying the invention is also solved by a system or method for identifying and verifying a valuable object, in particular the above-described valuable object, by assigning each valuable object a unique and distinctive readable security code and the associated security code of the valuable object that is valid only in the entirety of all code components, is stored in a secure database for identification and verification. The problem underlying the invention is also solved by a system or arrangement for identifying and verifying a valuable object, in particular the above-described valuable object, by assigning each valuable object a unique and distinctive readable security code and the associated security code of the valuable object that is valid only in the entirety of all code components, is stored in a secure database for identification and verification.

The fact that the security code is saved, for example personalized, in a secure database or a database server, makes it readily possible for any user to read out the unique verification and identification code of the valuable object via a corresponding reading device, e.g., a mobile device at the respective location and virtually in real time. In this case, a smart phone, notebook, computer, tablet or the like provided with a corresponding application can preferably also be used as a read-out device or as a reading device.

The code that has been read out can be compared to the code stored in the database via a secure, encrypted data connection, for example via an Internet connection, in order to carry out not only an identification or authentication check, but also a verification check.

In the database of the system according to the invention, the corresponding security code can be stored for each manufactured valuable object, whereby the security code can also be assigned specific data, such as material, weight, quality, dimensions, volume or the like of the valuable object. In this way, it is possible to determine the current value of the valuable object in the course of a query of the security code on the basis of the specific data. It is particularly advantageous that the base body of the valuable object is made of fine gold of about 24 carats, since the current price of gold can be queried worldwide and thus the current value for each country can be issued. The query of the security code based on the specific data also allows 100% confirmation of the originality and the entirety of the code components of the gold piece. If, however, a manipulation of the piece of gold took place, the confirmation is refused, The proposed valuable object can be used in conjunction with the security code as an asset protection system, for example in barter transactions, in banking transactions or as a secure private investment. Thus, the valuable object is independent of economic and political factors, but also of certain country-specific events. The valuable object is preferably traded as a collector's item.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
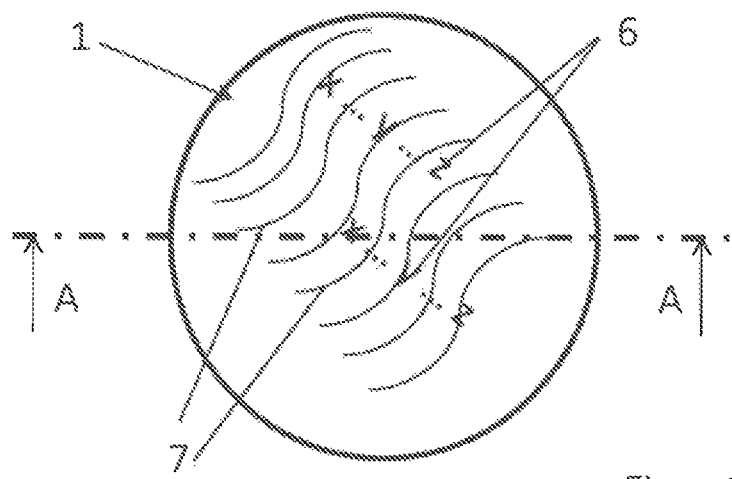
FIG. 1 is a schematic top view of a valuable object according to the invention.

The preferred embodiments of the present invention will now be described with reference to FIGS. 1-3 of the drawings. Identical elements in the various figures are designated with the same reference numerals.

FIG. 1 shows by way of example one embodiment of a valuable object 1 according to the invention, for example as a fine gold piece. In the illustrated embodiment, the object has, for example, a circular cylindrical flat shape, which is provided with appropriate embossments if required.

Figure 2:
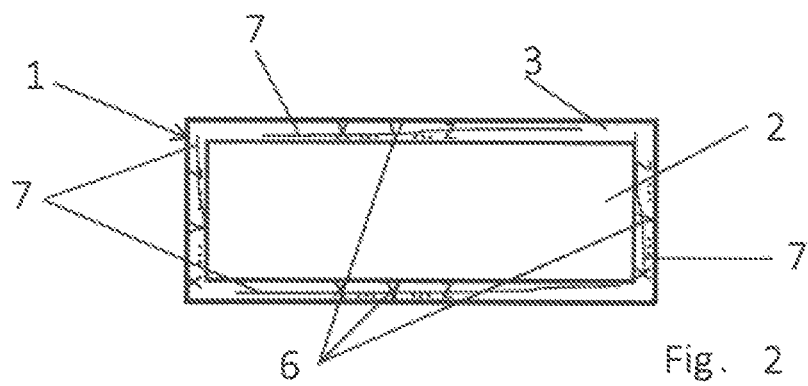
FIG. 2 is a schematic sectional view along the section line A-A according to FIG. 1.

As can be seen in particular from the sectional view along the section line A-A shown in FIG. 2, the proposed valuable object 1 comprises a base body 2 made of fine gold, which is completely surrounded by a protective layer 3 and thus protected against manipulation. The protective layer 3 is designed as a chemical or non-chemical nano-alloy layer or the like. Furthermore, within the protective layer 3, at least one randomly generated for example personalized security code 6 is provided for identification and verification purposes, wherein the security code 6 is presented only schematically, e.g., by a letter sequence xyz in FIGS. 1 and 2. The security code 6 can extend as required over the entire or only over parts of the protective layer both inside and on the surface. Furthermore, at least one uncharacteristic security feature 7 is provided for additional verification. In this way, the valuable object 1 or the integrity of the protective layer 3 can be verified, since manipulation of the basic body 2 and the security code 6 contained in the protective layer is impossible due to the at least one existing security feature 7. The existing security feature 7 is indicated only schematically in FIGS. 1 and 2. Thus, the proposed valuable object constitutes a holistic protection.

Figure 3:
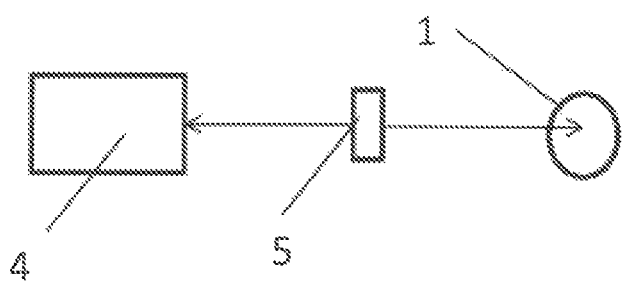
FIG. 3 is a schematic view of a system according to the invention for identifying and verifying a valuable object.

FIG. 3 shows a system according to the invention for identifying and verifying the valuable object 1. The system comprises a secure database or a secure database server 4, in which, for example, the randomly generated security code 6 of the respective valuable object 1 is stored. This takes place, for example, after the production and before the sale of the valuable object 1, so that it is registered in the database 4. Via a readout device 5, which can be connected to the database 4, for example via the mobile Internet (see arrow in FIG. 3), the security code 6 present in the protective layer 3 of the valuable object 1 can be read out (see arrow in FIG. 3) and identified and verified via the data connection using the database 4. In this way, it is possible to quickly identify the valuable object 1, also mobile, in order to realize an uncomplicated and secure barter. As soon as the query via the readout device 5 is successfully completed in the database 4, specific data of the valuable object 1 associated with the security code 6 can be queried, so that, for example, the daily value of the valuable object 1 is output or retrieved in real time using the current price of gold.

Preferably a mobile phone or tablet with a corresponding application can be used as the readout device 5, which can capture the security code 6, for example, opto-electrically or the like and then transmit the data via the secure mobile data connection to the database 4 or the database server 4 for query. Subsequently, the result of the query is transmitted from the database server 4 to the readout device or the mobile phone 5 and displayed via the application. The readout device 5 is also able to check the security feature 7 that is present in the protective layer 3 for authenticity.

There has thus been shown and described a novel valuable object and a system and method for identifying and verifying a valuable object, which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A valuable object comprising a base body made of gold, wherein the base body is surrounded by a protective layer which includes at least one readable security code for identifying and verifying the object, wherein the security code is integrated in the protective layer such that manipulation of the protective layer can be detected by reading out the security code.

2. Valuable object as in claim 1, wherein the protective layer comprises at least one additional security feature for authentication.

3. Valuable object as in claim 2, wherein an uncharacteristic feature is provided as the security feature.

4. Valuable object as in claim 2, wherein at least one evident feature as a true color effect is provided as the security feature.

5. Valuable object as in claim 2, wherein at least one openly disclosed feature as a microtext is provided as the security feature.

6. Valuable object as in claim 2, wherein at least one hidden feature as a nanotext is provided as the security feature.

7. Valuable object as in claim 2, wherein at least one invisible feature as a forensic feature is provided as the security feature.

8. Valuable object as in claim 1, wherein a fine gold coin is provided with a base body made of fine gold with approximately 24 carats.

9. A system for identifying and verifying a valuable object as defined in claim 1, comprising a secure database having the security code stored therein for identification and verification of the valuable object.

10. The system defined in claim 9, wherein the security code of the valuable object to be identified can be retrieved with a readout device wherein the read out security code can be compared via an encrypted data connection with the security code stored in the database.

11. The system defined in claim 9, wherein specific data of the valuable object are assigned to the security code stored in the database.

12. The system defined in claim 11, further comprising means for retrieving a current value of a valuable object on the basis of the specific data stored in a memory, in response to a positive query of the security code.

13. A method for identifying and verifying a valuable object as defined in claim 1, comprising the step of storing at least one readable security code assigned to the valuable object in a secure database.

14. The method defined in claim 13, further comprising the step of retrieving the security code of the valuable object to be identified by means of a readout device and comparing the read out security code via an encrypted data connection with the security code stored in the database.

15. The method defined in claim 13, wherein specific data of the valuable object are assigned to the security code stored in the database.

16. The method defined in claim 13, further comprising the step of retrieving a current value of a valuable object on the basis of the specific data stored in a memory, upon receipt of a positive query of the security code.

17. A valuable object comprising a base body made of gold, wherein the base body is surrounded by a protective layer which includes at least one readable security code for identifying and verifying the object, wherein the protective layer comprises at least one additional security feature for authentication.

18. A system for identifying and verifying a valuable object as defined in claim 17, comprising a secure database having the security code stored therein for identification and verification of the valuable object.

19. A method for identifying and verifying a valuable object as defined in claim 17, comprising the step of storing at least one readable security code assigned to the valuable object in a secure database.

20. The method defined in claim 19, wherein specific data of the valuable object are assigned to the security code stored in the database.

* * * * *